2,883,413
PROCESS FOR PREPARING ALIPHATIC NITRILES

William L. Fierce, Crystal Lake, and Walter J. Sandner, Carpentersville, Ill., assignors to The Pure Oil Company, Chicago, Ill., a corporation of Ohio No Drawing. Application September 30, 1957
Serial No. 686,887

8 Claims. (Cl. 260—465.1)

This invention relates to new and useful improvements in methods for preparing organic nitriles and more particularly to a method of preparing aliphatic nitriles by reaction of cyanogen and alkylene epoxides at elevated temperatures.

It is one object of this invention to provide an improved method for preparing aliphatic nitriles.

Another object of this invention is to provide a method of preparing a variety of aliphatic nitriles from alkylene epoxides.

A feature of this invention is the provision of a process for preparing aliphatic nitriles by high-temperature reaction of cyanogen and an alkylene epoxide.

Another feature of this invention is the provision of a process for preparing aliphatic nitriles, such as acetonitrile, propionitrile, acrylonitrile, and butyronitrile by the high-temperature reaction of cyanogen and lower alkylene epoxides at a temperature above the decomposition point of the alkylene epoxides.

Other objects and features of this invention will become apparent from time to time throughout the specification and claims as hereinafter related.

This invention comprises a process in which cyanogen and an alkylene epoxide are reacted at a temperature in the range from 500° to 1000° C. Within this range of temperature, alkylene epoxides decompose readily to produce free radicals which react readily with cyanogen to produce aliphatic nitriles as the principal reaction products. The stoichiometry of the reaction is not accurately known, and because of the formation of decomposition products of the free radicals, no precise equation can be written for the process. The reaction apparently proceeds by decomposition of the epoxide to form free radicals which combine with cyanogen to form aliphatic nitriles, together with carbon monoxide, methane, hydrogen, and small amounts of other by-products.

This reaction proceeds well with any of the lower aliphatic epoxides, including ethylene oxide, propylene oxide, butylene oxide, amylene oxide, octylene oxide, and octadecylene oxide. The reaction proceeds well at atmospheric pressure, although it may be carried out at either subatmospheric or superatmospheric pressures. In carrying out this reaction, the preferred mole ratio of alkylene epoxide to cyanogen is in the range from 1:6 to 6:1. Lower ratios of the epoxide to cyanogen tend to produce lower yields of nitriles per pass through the reaction zone. On the other hand, higher proportions of the alkylene epoxides produce higher yields per pass, but result in substantial losses through side reactions of the free radicals liberated on decomposition of the epoxides. While the aforementioned range of proportions is somewhat preferred, the mole ratio of alkylene oxides to cyanogen may vary widely, as for example, from 1:20 to 20:1, and still produce organic nitriles as principal reaction products. The reaction gases may be passed through the reaction zone at a gaseous hourly space velocity of approximately 50 to 2000, with a space velocity of 150 to 500 being preferred. In this process the term "space velocity" refers to the ratio of a volume of reactant gases, at standard temperature and pressure, charged per hour, to the volume of the reactant space.

The preferred method of carrying out this process is to mix the alkylene epoxide to be reacted and cyanogen in the gaseous state, and pass the mixture through a heated reaction zone. When relatively non-volatile alkylene epoxides are to be reacted, they are fed as liquids directly to the reactor and vaporized directly into the reaction zone. Any type of reaction zone may be used which is resistant to attack by the reactants or the reaction products. Quartz, high silica glass, stainless steel, or other refractory and corrosion-resistant materials may be used. The reaction zone may be heated by any suitable means, such as combustion gases applied externally to the reactor, external or internal electrical heaters, including resistance heaters and induction heaters, heating tubes extending through the reactor, or hot refractory pebbles continuously or intermittently supplied to the reactor.

The product gases from the reaction zone consist of a mixture of aliphatic nitriles, unreacted cyanogen and alkylene epoxides, methane, carbon monoxide, ethylene, ethane, and hydrogen. These reaction gases are withdrawn from the reaction zone and cooled to a temperature sufficiently low to condense the nitriles and condensible by-products, so that the unreacted cyanogen and alkylene epoxides may be recycled to the reaction zone. The liquid which is condensed from the reaction gases ordinarily must be fractionated to obtain pure nitriles. Fractionation may also be necessary for efficient recycle of the cyanogen and unreacted alkylene epoxides.

A number of experiments were carried out in which ethylene oxide and cyanogen were reacted at elevated temperatures under a variety of conditions. In these experiments gaseous mixtures of helium, ethylene oxide, and cyanogen were mixed at room temperature and then passed through an empty, electrically heated tube of Vycor high-silica glass. The gas mixture charged to the reactor tube and the product gases were analyzed by mass spectrometer to determine the composition of the charge gas and the product gases. The helium was used as a diluent or carrier gas and did not take part in the reaction. The experimental conditions and results are set forth in Table I.

From these and other experiments it has been found that there is no formation of nitriles at temperatures below about 500° C. At temperatures above 500° C., the products obtained depend upon the temperature, mole ratio of reactants, and the particular alkylene epoxide used. In the range from about 500° to 600° C. acetonitrile is the only product formed. At temperatures above 600° C. the products include acetonitrile, acrylonitrile, and propionitrile with the relative amounts varying somewhat with varying ratios of reactants. The proportion of acetonitrile in total nitrile products tends to increase as the cyanogen/ethylene oxide mole ratio increases. In general, the yield of nitriles tends to improve as the cyanogen/ethylene oxide mole ratio increases. Mass spectrometric analyses indicate that in the best runs the nitriles formed account for about half of the cyanogen consumed and the remainder of the cyanogen consumed is accounted for in the formation of hydrogen cyanide as a reaction by-product.

When this method is carried out using propylene oxide in place of ethylene oxide, nitriles are formed in moderately high yield. Propylene oxide is mixed with helium and cyanogen using a mole ratio of cyanogen to propylene oxide of about 6 to 1, passed through the reactor at a gaseous hourly space velocity of 200–300 and heated to about 650° C. Under these conditions, a mixture of ni-

Table 1

| Run No | 99 | 97 | 16 | 17 | 51 | 52 |
|---|---|---|---|---|---|---|
| Temperature (° C.) | 491 | 579 | 647 | 638 | 641 | 640 |
| Gaseous hourly space velocity of total charge gas | 205 | 181 | 265 | 272 | 236 | 253 |
| Mole Ratio of $(CN)_2/C_2H_4O$ | 0.24 | 0.36 | 0.99 | 0.32 | 4.9 | 8.6 |
| Percent $C_2H_4O$ consumed | 1.7 | 90.0 | 97.6 | 96.4 | 92.8 | 93.8 |
| Percent $(CN)_2$ consumed | 0.7 | 58.0 | 44.5 | 64.0 | 15.7 | 9.8 |
| Acetonitrile—Molar Yield per pass: | | | | | | |
| Based on $C_2H_4O$ | 0.0 | 4.0 | 9.6 | 3.0 | 28.4 | 32.1 |
| Based on $(CN)_2$ | 0.0 | 11.1 | 9.7 | 9.5 | 5.8 | 3.7 |
| Acetonitrile—Selectivity: | | | | | | |
| Based on $C_2H_4O$ | 0.0 | 4.4 | 9.8 | 3.1 | 30.7 | 34.2 |
| Based on $(CN)_2$ | 0.0 | 19.2 | 21.8 | 14.8 | 37.0 | 39.1 |
| Total Nitriles [1]—Molar Yield per pass: | | | | | | |
| Based on $C_2H_4O$ | 0.0 | 4.0 | 18.5 | 7.2 | 40.5 | 42.6 |
| Based on $(CN)_2$ | 0.0 | 11.1 | 18.8 | 22.7 | 8.3 | 4.9 |
| Total Nitriles [1]—Selectivity: | | | | | | |
| Based on $C_2H_4O$ | 0.0 | 4.4 | 19.0 | 7.5 | 43.7 | 45.5 |
| Based on $(CN)_2$ | 0.0 | 19.2 | 42.2 | 35.6 | 52.5 | 50.6 |
| Percent Acetonitrile in total nitriles | 0.0 | 100.0 | 51.6 | 41.8 | 70.4 | 75.3 |

[1] The nitriles formed are acetonitrile, acrylonitrile and propionitrile. The yield per pass is defined as moles of the indicated product formed, expressed as a percent of the moles of cyanogen or ethylene oxide charged. The Selectivity is a similar percentage based upon the moles of cyanogen or ethylene oxide consumed.

triles is formed in good yield and includes acetonitrile, acrylonitrile, propionitrile and butyronitrile.

When longer chain or branched-chain alkylene epoxides are reacted with cyanogen in the manner described for the reaction of ethylene oxide or propylene oxide and cyanogen, there are formed nitriles of the free radicals which are formed by decomposition of the particular alkylene oxides. Thus when octylene epoxide is reacted with cyanogen in about 1 to 6 mole ratio at about 700° C., there is formed a mixture of nitriles of $C_1$ to $C_8$ hydrocarbons.

The above disclosed nitriles and epoxides may be termed hydrocarbyl nitriles and hydrocarbyl epoxides respectively.

Having thus described our invention as required by the patent laws, we wish to have it understood that within the scope of the appended claims this invention may be practiced otherwise than as specifically described.

What is claimed is:

1. A method of preparing aliphatic hydrocarbyl nitriles by reacting an aliphatic hydrocarbyl epoxide with cyanogen at a temperature above the decomposition point of the aliphatic hydrocarbyl epoxide in the range from about 500° to 1000° C.

2. A method according to claim 1 in which the mole ratio of reactants is in the range of 1:20 to 20:1.

3. A method according to claim 1 in which the hourly space velocity of reactant charge gases is from 50 to 2000.

4. A method according to claim 1 in which the aliphatic epoxide is ethylene oxide.

5. A method according to claim 1 in which the aliphatic epoxide is propylene oxide.

6. A method according to claim 1 in which the aliphatic epoxide is octylene oxide.

7. A method of preparing lower aliphatic nitriles by reacting ethylene oxide with cyanogen in a mole ratio of 1:20 to 20:1, at an hourly gaseous space velocity of 150 to 500 and a temperature of 650° to 800° C.

8. A method of preparing lower aliphatic nitriles by reacting propylene oxide with cyanogen in a mole ratio of 1:20 to 20:1, at an hourly gaseous space velocity of 150 to 500 and a temperature of 650° to 800° C.

References Cited in the file of this patent

UNITED STATES PATENTS 2,459,430    Jefts et al.   _____ Jan. 18, 1949